United States Patent
Meyer et al.

(10) Patent No.: US 10,946,629 B2
(45) Date of Patent: Mar. 16, 2021

(54) DIECUT, IN PARTICULAR FOR PERMANENTLY CLOSING HOLES

(71) Applicant: tesa SE, Norderstedt (DE)

(72) Inventors: Katja Meyer, Hamburg (DE); Matthias Seibert, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 16/414,171

(22) Filed: May 16, 2019

(65) Prior Publication Data

US 2019/0352540 A1 Nov. 21, 2019

(30) Foreign Application Priority Data

May 18, 2018 (DE) .................. 10 2018 207 850.5

(51) Int. Cl.
*C09J 7/24* (2018.01)
*C09J 7/25* (2018.01)
(Continued)

(52) U.S. Cl.
CPC .............. *B32B 27/08* (2013.01); *B32B 3/266* (2013.01); *B32B 11/046* (2013.01); *B32B 27/20* (2013.01); *B32B 27/306* (2013.01); *B32B 27/32* (2013.01); *B32B 27/34* (2013.01); *C09J 7/29* (2018.01); *C09J 7/385* (2018.01); *C09J 133/08* (2013.01); *B29C 73/10* (2013.01); *B32B 7/027* (2019.01); *B32B 7/12* (2013.01); *B32B 2250/04* (2013.01); *B32B 2250/24* (2013.01); *B32B 2274/00* (2013.01); *B32B 2307/718* (2013.01); *B32B 2307/7265* (2013.01); *B32B 2323/00* (2013.01);
(Continued)

(58) Field of Classification Search
None
See application file for complete search history.

(56) References Cited

U.S. PATENT DOCUMENTS 4,461,795 A * 7/1984 Ogawa .................. B60C 13/001
428/66.5
4,494,671 A * 1/1985 Moore, III ............. B62D 25/24
220/257.1
(Continued)

FOREIGN PATENT DOCUMENTS

DE 4313008 C1 11/1994
DE 10 2006 038322 A1 2/2008
(Continued)

OTHER PUBLICATIONS

Machine Translation of DE 102010005182 A1, dated Jul. 2011 (Year: 2011).*
(Continued)

*Primary Examiner* — Jeffrey A Vonch
(74) *Attorney, Agent, or Firm* — Norris McLaughlin, P.A.

(57) ABSTRACT

Diecuts are configured for permanent closing of holes and have a carrier comprising an assembly of at least two polymeric films. An upper film of the at least two polymeric films has a basis weight of at least $1.0 \text{ kg/m}^2$ and a lower film of the at least two polymeric films consisting of at least two layers, wherein a first layer is in the form of a polymeric film and faces the upper film, and a second layer is in the form of a functional layer with a side of the lower film, facing away from the upper film, bears an applied adhesive composition.

20 Claims, 2 Drawing Sheets

(51) Int. Cl.
| | |
|---|---|
| *C09J 7/29* | (2018.01) |
| *C09J 133/08* | (2006.01) |
| *B32B 7/02* | (2019.01) |
| *B32B 27/08* | (2006.01) |
| *B32B 27/20* | (2006.01) |
| *B32B 27/30* | (2006.01) |
| *B32B 27/32* | (2006.01) |
| *B32B 27/34* | (2006.01) |
| *C09J 7/38* | (2018.01) |
| *B32B 3/26* | (2006.01) |
| *B32B 11/04* | (2006.01) |
| *C09J 7/35* | (2018.01) |
| *B32B 7/12* | (2006.01) |
| *B29C 73/10* | (2006.01) |
| *B32B 7/027* | (2019.01) |

(52) U.S. Cl.
CPC ....... *B32B 2323/04* (2013.01); *B32B 2331/04* (2013.01); *B32B 2377/00* (2013.01); *B32B 2395/00* (2013.01); *B32B 2398/00* (2013.01); *B32B 2405/00* (2013.01); *B32B 2605/00* (2013.01); *C09J 7/24* (2018.01); *C09J 7/241* (2018.01); *C09J 7/25* (2018.01); *C09J 7/35* (2018.01); *C09J 7/38* (2018.01); *C09J 2301/122* (2020.08); *C09J 2301/162* (2020.08); *C09J 2301/302* (2020.08); *C09J 2301/304* (2020.08); *C09J 2301/41* (2020.08); *C09J 2423/006* (2013.01); *C09J 2423/046* (2013.01); *C09J 2431/006* (2013.01); *C09J 2433/00* (2013.01); *C09J 2477/006* (2013.01); *C09J 2495/006* (2013.01); *Y10T 428/20* (2015.01); *Y10T 428/21* (2015.01); *Y10T 428/2495* (2015.01); *Y10T 428/24942* (2015.01); *Y10T 428/2826* (2015.01); *Y10T 428/2848* (2015.01); *Y10T 428/2891* (2015.01); *Y10T 428/31757* (2015.04); *Y10T 428/31855* (2015.04); *Y10T 428/31909* (2015.04)

(56) References Cited

U.S. PATENT DOCUMENTS

| | | | | |
|---|---|---|---|---|
| 4,563,379 A * | 1/1986 | Kruger | ............... | E04D 5/06 428/61 |
| 4,565,738 A * | 1/1986 | Purdy | ............... | B32B 27/32 428/349 |
| 4,824,726 A * | 4/1989 | Closson, Jr. | ............... | B32B 27/08 428/349 |
| 5,731,069 A * | 3/1998 | Delle Donne | ...... | C08L 23/0876 156/293 |
| 6,025,070 A * | 2/2000 | Heederik | ............... | B32B 27/34 428/343 |
| 6,527,899 B1 * | 3/2003 | Dietz | ............... | B29C 48/08 156/244.11 |
| 6,613,412 B1 * | 9/2003 | Dressier | ............... | B32B 7/06 428/334 |
| 6,613,870 B1 | 9/2003 | Harder et al. | | |
| 6,786,521 B1 * | 9/2004 | Jaffke | ............... | B60R 13/08 296/1.06 |
| 6,886,712 B2 * | 5/2005 | Hansel | ............... | B62D 25/24 220/359.4 |
| 8,709,200 B2 | 4/2014 | Müssig et al. | | |
| 8,802,777 B2 | 8/2014 | Zöllner et al. | | |
| 2002/0197425 A1 * | 12/2002 | Wolf | ............... | B29C 48/185 428/35.2 |
| 2003/0186048 A1 * | 10/2003 | Sieber | ............... | C09J 7/21 428/343 |
| 2004/0109968 A1 * | 6/2004 | Furst | ............... | C09J 7/405 428/40.1 |
| 2005/0179218 A1 * | 8/2005 | Wolf | ............... | B60J 10/34 277/654 |
| 2007/0014984 A1 * | 1/2007 | Stout | ............... | C09J 7/241 428/353 |
| 2008/0029919 A1 * | 2/2008 | Howe | ............... | B29C 44/188 264/46.5 |
| 2008/0099944 A1 * | 5/2008 | Lipprandt | ............... | B32B 15/08 264/41 |
| 2008/0113166 A1 * | 5/2008 | Kolmorgen | ............... | B32B 25/10 428/212 |
| 2008/0199647 A1 * | 8/2008 | Blackwell | ............... | G09F 3/02 428/41.8 |
| 2010/0104864 A1 | 4/2010 | Zöllner et al. | | |
| 2011/0177331 A1 * | 7/2011 | Mosher | ............... | C09J 7/20 428/354 |
| 2011/0189416 A1 * | 8/2011 | Kuriyama | ............... | C08G 18/722 428/35.7 |
| 2011/0256382 A1 * | 10/2011 | Jung | ............... | B32B 27/18 428/323 |
| 2012/0000591 A1 | 1/2012 | Müssig et al. | | |
| 2015/0190988 A1 * | 7/2015 | Saxberg | ............... | B32B 27/08 428/214 |
| 2016/0230048 A1 * | 8/2016 | Edmonds | ............... | C09J 7/385 |
| 2016/0243800 A1 * | 8/2016 | Kolbasuk | ............... | B32B 25/08 |
| 2016/0271866 A1 | 9/2016 | Niemeyer et al. | | |
| 2017/0323589 A1 * | 11/2017 | Mitchell | ............... | C09J 7/29 |
| 2018/0118981 A1 * | 5/2018 | Durand | ............... | B32B 27/12 |
| 2018/0147806 A1 * | 5/2018 | Mitchell | ............... | B32B 7/12 |
| 2018/0362811 A1 * | 12/2018 | Waid | ............... | C09J 7/38 |
| 2020/0061968 A1 * | 2/2020 | Piran | ............... | B32B 7/12 |

FOREIGN PATENT DOCUMENTS

| | | | | |
|---|---|---|---|---|
| DE | 10 2008 050772 A1 | 5/2009 | | |
| DE | 10 2009 005517 A1 | 7/2010 | | |
| DE | 102010005182 A1 * | 7/2011 | ......... | A47G 27/0462 |
| DE | 20 2012 101764 U1 | 8/2013 | | |
| EP | 19 78 069 A1 | 10/2008 | | |
| EP | 30 36 100 A1 | 6/2016 | | |
| FR | 2935667 A1 * | 3/2010 | ............ | C08F 255/02 |
| GB | 1045472 A * | 10/1966 | ............ | G10K 11/165 |
| JP | 61132473 A * | 6/1988 | ............ | B62D 25/24 |
| KR | 10-1999-0067535 A | 8/1999 | | |
| KR | 10-2016-0045842 A | 4/2016 | | |
| WO | WO-9622340 A2 * | 7/1996 | ......... | B29C 44/351 |
| WO | 2005/097582 A1 | 10/2005 | | |
| WO | 2006/053827 A1 | 5/2006 | | |

OTHER PUBLICATIONS

German Search Report dated Feb. 12, 2019, corresponds to German Application No. 10 2018 207 850.0.
Fox equation (EI) (cf. T.G. Fox, Bull. Am. Phys. Soc. 1 (1956) 123).
Houben Weyl, Methoden der Organischen Chemie, vol. E 19a, pp. 60 to 147.
Handbook of Pressure Sensitive Adhesive Technology by Donatas Satas (van Nostrand, New York 1989).
Tables by the method of Fikentscher [P.E. Hinkamp, Polymer, 1967, 8, 381].
English translation of Office Action dated Aug. 28, 2020, in connection with Korean Patent Application No. 10-2019-0057635.

* cited by examiner

DIECUT, IN PARTICULAR FOR PERMANENTLY CLOSING HOLES

This application claims foreign priority benefit under 35 U.S.C. § 119 of German Application No. 10 2018 207 850.5 filed May 18, 2018.

The present invention relates to a diecut especially for the permanent closing of holes which are located preferably in metal sheets or in plastics parts, and also to a method for permanently closing holes.

In the fabrication of relatively complex structures from metal sheets and/or plastics, constructional dictates make it impossible to avoid having to cut holes into the sheets or plastics, in order to gain access to cavities situated behind them, whether for the purpose of painting or for the purpose of welding.

When the desired operation has been concluded, these holes are usually no longer needed, and are often in fact disruptive, since they allow the passage of air, atmospheric moisture, or water into the structure, which may lead, for example, to processes of oxidation (rust).

One simple solution to avoiding these problems is to close the holes again after use.

Particularly in the production of modern vehicles such as watercraft, land vehicles (trucks, automobiles, etc.), air vehicles, space vehicles, and combinations thereof, such as amphibious vehicles, for example, it is inevitable that during assembly, in numerous individual parts made from metal sheets or plastics, holes of different sizes are required. The hole diameters are customarily between 5 and 50 mm. In subsequent operation, many of these holes must be given airtight and in particular watertight closure again, in order to prevent said corrosive attacks.

Another requirement is to achieve a considerable improvement in the soundproofing of the passenger interior through the closing of the holes.

The problems underlying the invention, and also the solution to these problems, are described below using the body of an automobile as an example. This expressly does not restrict the concept of the invention to said application. Said application is part of the technical field in which the invention is manifested to particular advantage.

If from this point on there is reference to use in a vehicle body, the skilled person reads this as embracing all other application possibilities as well as a vehicle body.

In automobile construction, holes must be made, or punched out, at various locations in the vehicle body. Generally this is done as part of the operation of punching and forming the individual sheet-metal or aluminium parts; additionally, holes may also be drilled in plastics components. Subsequently, by means of a variety of joining processes, the individual metal parts are connected with one another, and the bodyshell is formed. The uses of the holes, openings, or passages in this bodyshell include their use as paint drainage holes (for cathodic electrocoat materials, for example), wax injection holes, wax drainage holes, holes for later screw-mounting operations in assembly, or for cable passages. After the cathodic electrocoat material has dried, many of these holes must be closed again, or else must be closed after the final clearcoat operation (in which case hole closure would take place in the assembly process).

There are many possible reasons why it is necessary for a hole to be closed, examples being:
moisture
acoustics
corrosion prevention Generally speaking, the holes or openings are closed by means of injection-moulded parts (plugs) made from various polymers manufactured according to the profile of requirements. These may be, for example, plugs made from PET, ABS, PP, PVC, EPDM, PA, and other commercial polymers, or else combinations of the stated materials and customary commercial polymeric substrates not listed here. Also in use are materials which possess a glass fibre fraction; also conceivable are carbon fibres, which strengthen the plug against being punctured, for example. In principle all common polymeric substrates are possible, provided they offer particular parameters in relation to paintability, temperature stability, and dimensional stability under climatic conditions, and also fulfil a certain economy in the plug manufacturing process.

At the present time, vehicle bodywork holes are generally closed using plastics plugs which on the one hand, in a particular case, do not securely close the hole, and on the other hand are comparatively complicated and expensive to produce.

Each size of hole requires a specific plug adapted to the hole size. This entails high logistical and administrative effort for the consumer of the plugs.

On the production line it is necessary accordingly to hold a large number of plugs of different sizes in individually assigned storage crates.

Also suitable for this purpose are adhesive tapes, which are cut to length or die-cut in accordance with the hole size. Adhesive tapes as well, however, do not always do justice to the increasingly high market requirements.

The intention here is to look more closely at the self-adhesive hole closures, which are required to achieve an acoustic effect.

These acoustically relevant hole closures are often used in assembly in order to obtain an isolated region, the vehicle interior, within the passenger cell. Disruptive acoustics in the vehicle interior are generated, for example, by rolling noises from the tyres or else by loose gravel and also small chippings which are thrown against the vehicle panelling and also against the vehicle's structural members. Moreover, wind noises which come about as a result of unstreamlined design are another possible cause of a relatively high, unwanted noise level within the passenger cell.

The noise caused by loose gravel, chippings, rolling noises from the tyres, and by unevennesses in the ground is often transmitted into the cavities in the structural member systems (side and cross members) and into the vehicle interior or passenger cell. As a result of this, products with acoustic activity must also be employed outside the vehicle. One form of effective acoustic protection, for example, is to tape off holes in the floor assembly or in the vehicle platform. Holes, punched apertures, or drilled apertures are often made in the side and cross members. Here, particular attention must be paid to carefully closing every possible opening.

As already described, numerous holes in the sheet-metal bodywork parts, or in the structural member systems, serve to allow the cathodic electrocoat material to drain as rapidly as possible from the body and from all kinds of cavities, in order to secure operating time. This means, conversely, that the openings and holes must be reliably closed immediately downstream of the cathodic electrocoat dryer. Generally this is done on what is called the PVC line. This area relates to a manufacturing step which takes place before application of primer-surfacer or before application of basecoat material. A further feature to be fulfilled, therefore, is repaintability for products which are employed within this production segment. Moreover, there must be compatibility with PVC seam-sealing material, since gaps are sealed with pumpable PVC compounds between the cathodic electrocoat dryer and the next coating layer.

Hole closure products based on heavy-duty film in combination with a film applied to the top side are known from EP 3 036 100 A1. Disclosed therein is a diecut especially for the permanent closing of holes especially in metal sheets or in plastics parts, having a carrier comprising a laminate of at least two polymeric films, the lower film having a basis weight of at least 1.5 kg/m², more particularly between 1.5 and 6 kg/m², and the side of the lower film opposite the upper film bearing an applied adhesive, more particularly curable or self-adhesive, composition. The upper film consists preferably of polyester, more preferably of polyethylene terephthalate (PET).

Advantages accompanying the heavy-duty films as they are described in EP 3 036 100 A1 are that on the one hand they permit adequately good anchoring to the adhesive composition that is to be applied, and on the other hand that they also contain no substances which can migrate into adhesive and so interfere with the adhesive.

However, the mechanical properties, especially the tear strength, of the heavy-duty films known to date are limited.

It is an object of the invention to provide a diecut which is suitable for permanently closing holes, especially in metal sheets or in plastics parts of automobile bodies, and which closes said holes such that moisture penetration is impossible, and which enhances soundproofing and which reliably closes the holes even on stone chipping in the underfloor region and on mechanical stresses within the interior, especially in the floor area.

This object is achieved by means of a diecut as specified in the main claim. The dependent claims relate to advantageous onward developments of the subject matter of the invention.

The invention accordingly provides a diecut especially for the permanent closing of holes, particularly in metal sheets or in plastics parts, having a carrier composed of an assembly, more particularly laminate, of at least two polymeric films. The upper film of the at least two polymeric films has a basis weight of at least 1.0 kg/m² (hereinafter, the upper film is also referred to as heavy-duty film). The lower film of the at least two polymeric films consists of at least two layers, a first layer in the form of a polymeric film which faces the heavy-duty film, and a second layer in the form of a functional layer, and the lower film, on the side facing away from the upper film, bearing an applied adhesive, more particularly self-adhesive, composition.

The upper film of the at least two polymeric films and also the polymeric film and the functional layer of the lower film, according to one preferred embodiment, are each implemented over the full area, meaning that they contain no holes or vacancies.

According to one preferred embodiment of the invention, the upper, heavy-duty film has a basis weight of between 1.0 and 6 kg/m², preferably of between 1.5 and 3.9 kg/m², more preferably of between 1.5 and 2.5 kg/m².

The heavy-duty film may consist of any desired polymers, either alone or in a mixture. Suitable polymers are olefinic polymers such as homopolymers or copolymers of olefins such as ethylene, propylene, or butylene (the term "copolymer" is to be understood here as including terpolymers), polypropylene homopolymers or polypropylene copolymers, including the block (impact) polymers and random polymers.

Further polymers may be selected from the group of the polyesters such as, in particular, polyethylene terephthalate (PET), polyamides, polyurethanes, polyoxymethylene, polyvinyl chloride (PVC), polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), polyarylene sulfides and/or polyarylene oxides.

These polymers, alone or in a mixture, are suitable for forming the heavy-duty film.

The upper film may consist preferably of polyester (more particularly of polyethylene terephthalate (PET)), polyurethane, or PVC.

The heavy-duty film is preferably filled with mineral fillers, more particularly finely ground limestone or calcite ($CaCO_3$) and barite ($BaSO_4$). Additionally used for filling may be talc, finely ground slate, graphite, mica, or asbestos (the latter nowadays less so).

The fraction of fillers is in particular 30 to 90 wt %, preferably 40 to 70 wt %, based on the total film weight.

Expressed as a volume percentage, the fraction is preferably 30 to 60 vol %, more preferably 45 to 55 vol %, based on the total film volume.

The heavy-duty film may additionally comprise oil for swelling and for better accommodation of the fillers. The oil content may be between 8 wt % to 30 wt %, preferably 10 wt % to 25 wt % based on the total film weight.

The heavy-duty film is preferably a polyolefin film, more particularly a mineral-filled polyolefin film, a polyethylene and EVA film, more particularly a mineral-filled polyethylene and EVA film, or an elastomer-modified bitumen film. With further preference the heavy-duty film comprises oil.

The composition of the upper film, according to one preferred embodiment of the invention, is as follows:

| | |
|---|---|
| 30-82 wt % | filler, especially $CaCO_3$ |
| 10-50 wt % | polyethylene |
| 0-20 wt % | EVA |
| 8-30 wt % | oil |

The thickness of the upper film according to one preferred embodiment is between 400 and 3500 μm, preferably between 1100 and 3500 μm, more preferably between 1700 and 3500 μm.

Possible production variants of a heavy-duty film of this kind are extrusion processes or casting processes.

The lower film, consisting of at least two polymeric films, is joined firmly to the heavy-duty film; between the upper and lower films there may be further layers, particularly in the form of films.

According to one preferred variant, the polymers of the polymeric film which faces the heavy-duty film correspond to a type of polymer used in the heavy-duty film. For a heavy-duty film based on polyolefins, for example, PE (polyethylene) or PP (polypropylene) may be used for the polymeric film.

The polymeric film layer which faces the heavy-duty film comprises, and more particularly consists, according to one preferred embodiment of the invention, of polyolefins, a term which comprehends polyethylene, polypropylene, and also homopolymers and copolymers of polyethylene and polypropylene. The copolymers may be statistically distributed or block copolymers with comonomers such as ethylene and/or propylene or other α-olefins. This film may also be a blend with other polyolefins, especially polyethylene or ethylene copolymers with comonomers such as 1-butene, 1-hexene, 1-octene (in that case, depending on proportion and production process, called LLDPE, VLDPE or ULDPE or metallocene-PE), but also ethylene-styrene copolymers, ethylene with polar comonomers such as acrylic acid, alkyl acrylates, alkyl methacrylates or vinyl acetate, or grafted copolymers for example with maleic anhydride.

The second layer of the lower film is a functional layer and has a barrier effect with respect to migratable substances such as plasticizers, especially oils, which could diffuse from the heavy-duty film into the adhesive. At the same time, preferably, the functional layer has a barrier effect for migratable substances such as tackifier resins, which could, conversely, diffuse out of the adhesive into the heavy-duty film. The functional layer preferably has the barrier effect with respect to both sides. Furthermore, this layer may also have adhesion-promoting properties.

The polymers of the functional layer may be selected from the group of the polyesters such as, in particular, polyethylene terephthalate (PET), polyamides, polyurethanes, polyoxymethylene, polyvinyl chloride (PVC), polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), polyimide (PI), polyarylene sulfides and/or polyarylene oxides, either alone or in a mixture. The functional layer preferably comprises and more preferably consists of one of the stated polymers.

With particular preference the functional layer consists of polyamide.

The advantage of polyamide is that a film of polyamide has good barrier properties with respect to oil.

According to one preferred embodiment of the invention, the polymeric film consists of polyethylene and the functional layer consists of polyamide.

Between the first layer in the form of a polymeric film and the second layer in the form of a functional layer, there may be further (functional) layers present, such as, for instance, adhesion promoters for improving the adhesion in the assembly.

Multilayer constructions of these kinds are obtainable preferably from blown-film extrusion and cast extrusion. Another possibility, however, is that of producing them by lamination of films with or without laminating adhesive.

The thickness of the lower film is preferably between 25 and 200 µm, more preferably between 40 and 140 µm, very preferably between 50 and 90 µm.

The thickness of the functional layer is preferably selected to be as small as possible, since the correspondingly functional polymers are typically more expensive.

Based on the total thickness of the lower film, the functional layer has a thickness preferably of 5 to 80%, more preferably of 20 to 50%.

If the lower film consists only of a polymeric film and of the functional layer, the thickness of the polymeric film layer is preferably 20 to 95%, more preferably 50 to 80%, of the total film thickness.

The thickness of the functional layer is selected such that it is not zero, within the technically dictated thickness tolerance. At no point, therefore, is this layer ever completely absent.

The multilayer lower film is preferably applied directly in the process for producing the heavy-duty film. For this purpose, the hot polymer mixture of the heavy-duty film is applied to the surface of the polymeric film of the lower film, which consists of a type of polymer which is compatible—that is, miscible—with the type of polymer used in the heavy-duty film. The polymeric film undergoes partial melting, preferably in a region of up to 90% of the total thickness, more preferably in a region of up to 10% of the total thickness. The polymer of the heavy-duty film mixes with that of the polymeric film, so producing an indissoluble assembly after cooling.

The melting point of the polymer of the functional layer is situated in particular above the melting point of the polymer of the upper film, more particularly by 20° C., preferably by 30° C., more preferably by 50° C., in order to prevent incipient melting.

Common methods for producing the carrier include, for example, a process of cast extrusion of the heavy-duty film material onto the multilayer lower film. In this case the lower film is typically guided over the chill roll of the extrusion line. Other commonplace coating methods are also possible, however.

Production takes place preferably by calendar coating.

As well as this process, the skilled person is also familiar with further possibilities for producing such a connection between two films. One example of this would be hot lamination.

On the side of the heavy-duty film opposite to the lower film, there may be further plies such as a diecuttable aluminium sheet, a corrosion-resistant steel sheet, a film composed of any desired polymers, or an aluminium foil with a laid scrim for reinforcement or strength laminated to it.

The polymers for forming the upper film and the lower film may be present in pure form or in blends with additives such as antioxidants, light stabilizers, antiblocking agents, lubricants and processing aids, fillers, dyes, pigments, blowing agents, or nucleating agents.

The films preferably have none of the stated additives.

According to a further embodiment, the carrier may also have more than two films. In one advantageous development of the invention, there is a layer-form body present within the carrier (between the upper and lower films) or on the carrier that consists of metal, of a metal foil, aluminium foil for example, or of a foil comprising metal.

A metal which has emerged as outstanding is aluminium. Pure metal layers constitute a high barrier effect with respect to the migration and diffusion of the reactants.

With further advantage, layers of metal oxide (MeOx layers) may be used in accordance with the invention as separating layers. Advantageous metal oxide layers consist, for example, of silicon dioxide ($SiO_2$), titanium dioxide ($TiO_2$) or zinc-tin oxide (ZnSnO), or they comprise one or more of these metal oxides.

In a further advantageous embodiment of the invention, the upper and/or lower films are/is reinforced by integrated and/or attached fibres or filaments, in such a way that the strength of the film or films is reinforced especially in the longitudinal direction.

For the purposes of this invention, a filament refers to a bundle of parallel individual linear fibres often also referred to in the literature as a multifilament. This fibre bundle may optionally be given inherent strengthening by torsion, and is then referred to as spun or folded filaments. Alternatively the fibre bundle can be given inherent strengthening by entangling using compressed air or water jets. In the text below, for all of these embodiments—and also for the fibre-reinforced embodiment—only the term "filament" will be used, in a generalizing way.

In one preferred variant, the adhesive applied to the carrier is a pressure-sensitive adhesive, this being an adhesive which even under relatively gentle applied pressure permits a durable bond to virtually all substrates and which after use can be detached from the substrate again substantially without residue. A pressure-sensitive adhesive is permanently tacky at room temperature, thus having a sufficiently low viscosity and a high tack, and so the surface of the bond base in question is wetted by the adhesive under just gentle applied pressure. The bondability of the adhesive derives from its adhesive properties, and the redetachability from its cohesive properties.

It is possible here to employ all known adhesive systems. Besides natural or synthetic rubber based adhesives there are, in particular, silicone adhesives and also polyacrylate adhesives, preferably a low molecular mass acrylate hotmelt pressure-sensitive adhesive, that can be used.

Preferred adhesives are those based on acrylate or silicone.

The adhesive may be selected from the group of the natural rubbers or the synthetic rubbers, or from any desired blend of natural rubbers and/or synthetic rubbers, with the natural rubber or the natural rubbers being selectable in principle from all available grades such as, for example, crepe, RSS, ADS, TSR or CV products, depending on required level of purity and viscosity, and the synthetic rubber or synthetic rubbers being selectable from the group of the randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA), and polyurethanes, and/or blends thereof.

With further preference the rubbers may have their processing qualities improved by the admixing of thermoplastic elastomers in a weight fraction of 10 to 50% by weight, based on the total elastomer fraction.

Representatives that may be mentioned at this point include in particular the especially compatible styrene-isoprene-styrene (SIS) and styrene-butadiene-styrene (SBS) products. Suitable elastomers for blending are also, for example, EPDM or EPM rubber, polyisobutylene, butyl rubber, ethylene-vinyl acetate, hydrogenated block copolymers made from dienes (for example, by hydrogenation of SBR, cSBR, BAN, NBR, SBS, SIS or IR; such polymers are known as SEPS and SEBS, for example), or acrylate copolymers such as ACM.

In addition, a 100% system based on styrene-isoprene-styrene (SIS) has been found to be suitable.

Crosslinking is advantageous for improving the removability of the adhesive tape after use, and may be accomplished thermally or by irradiation with UV light or electron beams. For the purpose of the thermally induced chemical crosslinking it is possible to use all known, thermally activatable chemical crosslinkers such as accelerated sulfur or sulfur donor systems, isocyanate systems, reactive melamine, formaldehyde and (optionally halogenated) phenol-formaldehyde resins and/or reactive phenolic resin or diisocyanate crosslinking systems with the corresponding activators, epoxidized polyester resins and acrylate resins, and also combinations of these.

The crosslinkers are preferably activated at temperatures above 50° C., more particularly at temperatures from 100° C. to 160° C., very preferably at temperatures from 110° C. to 140° C. The thermal excitation of the crosslinkers may also be accomplished by means of IR rays or high-energy alternating fields.

It is possible to use adhesives with a solvent basis, with an aqueous basis, or in the form of a hotmelt system. An acrylate hotmelt-based adhesive is suitable as well, and may have a K value of at least 20, more particularly greater than 30, obtainable by concentrating a solution of such an adhesive to form a system which can be processed as a hotmelt.

Concentration may take place in appropriately equipped tanks or extruders; especially in the case of accompanying degassing, a devolatilizing extruder is preferred.

One adhesive of this kind is set out in DE 43 13 008 A1, whose content is hereby referenced and is made part of the present disclosure and invention.

The acrylate hotmelt-based adhesive may also be chemically crosslinked, however.

In a further embodiment, self-adhesives used are copolymers of (meth)acrylic acid and the esters thereof with 1 to 25 C atoms, maleic, fumaric and/or itaconic acid and/or their esters, substituted (meth)acrylamides, maleic anhydride, and other vinyl compounds, such as vinyl esters, more particularly vinyl acetate, vinyl alcohols and/or vinyl ethers.

The residual solvent content ought to be below 1% by weight.

One adhesive which has likewise shown itself suitable is a low molecular mass acrylate hotmelt pressure-sensitive adhesive, as carried by BASF under the designation acResin UV or Acronal®, more particularly Acronal® DS 3458 or AC Resin A 260UV. This low K value adhesive acquires its application-matched properties by virtue of a concluding crosslinking procedure initiated chemically by radiation.

Finally, it may also be mentioned that polyurethane-based adhesives are suitable as well.

For the purpose of optimizing the properties, the self-adhesive employed may be blended with one or more additives such as tackifiers (resins), plasticizers, fillers, pigments, UV absorbers, light stabilizers, ageing inhibitors, crosslinking agents, crosslinking promoters or elastomers.

Tackifiers used are the resins already comprehensively described.

Suitable fillers and pigments are, for example, carbon black, titanium dioxide, calcium carbonate, zinc carbonate, zinc oxide, silicates or silica.

Suitable plasticizers are, for example, aliphatic, cycloaliphatic and aromatic mineral oils, diesters or polyesters of phthalic acid, trimellitic acid or adipic acid, liquid rubbers (for example nitrile rubbers or polyisoprene rubbers), liquid polymers of butene and/or isobutene, acrylic esters, polyvinyl ethers, liquid resins and plasticizing resins based on the raw materials for tackifying resins, wool wax and other waxes, or liquid silicones.

Crosslinking agents are, for example, phenolic resins or halogenated phenolic resins, melamine resins and formaldehyde resins. Suitable crosslinking promoters are, for example, maleimides, allyl esters such as triallyl cyanurate, and polyfunctional esters of acrylic and methacrylic acid.

A "poly(meth)acrylate" is understood to be a polymer whose monomer basis consists to an extent of at least 60 wt % of acrylic acid, methacrylic acid, acrylic esters and/or methacrylic esters, with acrylic esters and/or methacrylic esters being present at least proportionally, preferably to an extent of at least 50 wt %, based on the overall monomer basis of the polymer in question. More particularly a "poly (meth)acrylate" is understood to be a polymer obtainable by radical polymerization of acrylic and/or methacrylic monomers and also, optionally, further, copolymerizable monomers.

In accordance with the invention the poly(meth)acrylate or poly(meth)acrylates is or are present at 30 to 65 wt %, based on the total weight of the pressure-sensitive adhesive (PSA). The PSA of the invention preferably comprises 35 to 55 wt %, based on the total weight of the PSA, of at least one poly(meth)acrylate.

The glass transition temperature of the poly(meth)acrylates which can be used in accordance with the invention is preferably <0° C., more preferably between −20 and −50° C. The glass transition temperature of polymers or polymer blocks in block copolymers is determined in the context of this invention by means of dynamic scanning calorimetry (DSC).

The poly(meth)acrylates of the PSA of the invention are obtainable preferably by at least proportional copolymerization of functional monomers which preferably are crosslinkable with epoxide groups. These monomers are more preferably those with acid groups (particularly carboxylic acid, sulfonic acid or phosphonic acid groups) and/or hydroxyl groups and/or acid anhydride groups and/or epoxide groups and/or amine groups; monomers containing carboxylic acid groups are especially preferred. It is very advantageous in particular if the polyacrylate features copolymerized acrylic acid and/or methacrylic acid. All of these groups have crosslinkability with epoxide groups, thereby making the polyacrylate amenable advantageously to thermal crosslinking with introduced epoxides.

Other monomers which may be used as comonomers for the poly(meth)acrylates, aside from acrylic and/or methacrylic esters having up to 30 C atoms per molecule, are, for example, vinyl esters of carboxylic acids containing up to 20 C atoms, vinylaromatics having up to 20 C atoms, ethylenically unsaturated nitriles, vinyl halides, vinyl ethers of alcohols containing 1 to 10 C atoms, aliphatic hydrocarbons having 2 to 8 C atoms and one or two double bonds, or mixtures of these monomers.

The properties of the poly(meth)acrylate in question may be influenced in particular by variation in the glass transition temperature of the polymer through different weight fractions of the individual monomers. The poly(meth)acrylate(s) of the invention may be traced back preferably to the following monomer composition:
a) acrylic esters and/or methacrylic esters of the following formula:

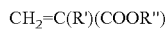

where R'=H or $CH_3$ and R" is an alkyl radical having 4 to 14 C atoms,
b) olefinically unsaturated monomers having functional groups of the kind already defined for reactivity with epoxide groups,
c) optionally further acrylates and/or methacrylates and/or olefinically unsaturated monomers which are copolymerizable with component (a).

The fractions of the corresponding components (a), (b), and (c) are preferably selected such that the polymerization product has a glass transition temperature of <0° C., more preferably between −20 and −50° C. (DSC). It is particularly advantageous to select the monomers of the component (a) with a fraction of 45 to 99 wt %, the monomers of component (b) with a fraction of 1 to 15 wt % and the monomers of component (c) with a fraction of 0 to 40 wt % (the figures are based on the monomer mixture for the "basic polymer", in other words without additions of any additives to the completed polymer, such as resins etc.).

The monomers of component (a) are more particularly plasticizing and/or non-polar monomers. Used preferably as monomers (a) are acrylic and methacrylic esters having alkyl groups consisting of 4 to 14 C atoms, more preferably 4 to 9 C atoms. Examples of such monomers are n-butyl acrylate, n-butyl methacrylate, n-pentyl acrylate, n-pentyl methacrylate, n-amyl acrylate, n-hexyl acrylate, n-hexyl methacrylate, n-heptyl acrylate, n-octyl acrylate, n-octyl methacrylate, n-nonyl acrylate and their branched isomers, such as isobutyl acrylate, isooctyl acrylate, isooctyl methacrylate, 2-ethylhexyl acrylate or 2-ethylhexyl methacrylate, for example.

The monomers of component (b) are more particularly olefinically unsaturated monomers having functional groups, more particularly having functional groups which are able to enter into a reaction with epoxide groups.

Used preferably for the component (b) are monomers having functional groups which are selected from the group encompassing the following: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, hydroxyethyl acrylate, more particularly 2-hydroxyethyl acrylate, hydroxypropyl acrylate, more particularly 3-hydroxypropyl acrylate, hydroxybutyl acrylate, more particularly 4-hydroxybutyl acrylate, hydroxyhexyl acrylate, more particularly 6-hydroxyhexyl acrylate, hydroxyethyl methacrylate, more particularly 2-hydroxyethyl methacrylate, hydroxypropyl methacrylate, more particularly 3-hydroxypropyl methacrylate, hydroxybutyl methacrylate, more particularly 4-hydroxybutyl methacrylate, hydroxyhexyl methacrylate, more particularly 6-hydroxyhexyl methacrylate, allyl alcohol, glycidyl acrylate and glycidyl methacrylate.

In principle it is possible to use as component (c) all vinylically functionalized compounds which are copolymerizable with component (a) and/or with component (b). The monomers of component (c) may serve to adjust the properties of the resultant PSA.

Exemplary monomers of component (c) are as follows:
Methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1, 1,3,3,3-hexafluoroisopropyl methacrylate, 2,2,3,3,3-pentafluoropropyl methacrylate, 2,2,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethyl-aminopropylacrylamide, dimethylaminopropylmethacrylamide, N-(1-methyl-undecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, and vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, and macromonomers such as 2-polystyreneethyl methacrylate (weight-average molecular weight Mw, determined by means of GPC, of 4000 to 13 000 g/mol), and poly(methyl methacrylate)ethyl methacrylate (Mw of 2000 to 8000 g/mol).

Monomers of component (c) may advantageously also be selected such that they include functional groups which support a subsequent radiation-chemical crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

The polyacrylates ("polyacrylates" are understood in the context of the invention to be synonymous with "poly(meth)acrylates") may be prepared by methods familiar to the skilled person, especially advantageously by conventional radical polymerizations or controlled radical polymerizations. The polyacrylates may be prepared by copolymerization of the monomeric components using the customary polymerization initiators and also, optionally, chain transfer agents, the polymerization being carried out at the customary temperatures in bulk, in emulsion, for example in water or liquid hydrocarbons, or in solution.

The polyacrylates are prepared preferably by polymerization of the monomers in solvents, more particularly in solvents having a boiling range of 50 to 150° C., preferably of 60 to 120° C., using the customary amounts of polymerization initiators, which in general are 0.01 to 5, more particularly 0.1 to 2 wt %, based on the total weight of the monomers.

Suitable in principle are all customary initiators familiar to the skilled person. Examples of radical sources are peroxides, hydroperoxides and azo compounds, for example dibenzoyl peroxide, cumene hydroperoxide, cyclohexanone peroxide, di-tert-butyl peroxide, cyclohexylsulfonyl acetyl peroxide, diisopropyl percarbonate, tert-butyl peroctoate and benzopinacol. One very preferred procedure uses as radical initiator 2,2'-azobis(2-methylbutyronitrile) (Vazo® 67™ from DuPont) or 2,2'-azobis(2-methylpropionitrile) (2,2'-azobisisobutyronitrile; AIBN; Vazo® 64™ from DuPont).

Solvents suitable for preparing the poly(meth)acrylates include alcohols such as methanol, ethanol, n- and isopropanol, n- and isobutanol, preferably isopropanol and/or isobutanol, and also hydrocarbons such as toluene and more particularly petroleum spirits with a boiling range from 60 to 120° C. Further possibilities for use include ketones such as preferably acetone, methyl ethyl ketone and methyl isobutyl ketone, and esters such as ethyl acetate, and also mixtures of solvents of the type stated, with preference being given to mixtures which comprise isopropanol, more particularly in amounts of 2 to 15 wt % preferably 3 to 10 wt %, based on the solvent mixture employed.

The preparation (polymerization) of the polyacrylates is followed preferably by a concentration procedure, and the further processing of the polyacrylates takes place with substantial absence of solvent. The concentration of the polymer may be effected in the absence of crosslinker and accelerator substances. Also possible, however, is the addition of one of these classes of compound to the polymer even prior to the concentration, so that the concentration then takes place in the presence of said substance(s).

The weight-average molecular weights $M_w$ of the polyacrylates are preferably in a range from 20 000 to 2 000 000 g/mol; very preferably in a range from 100 000 to 1 500 000 g/mol, most preferably in a range from 150 000 to 1 000 000 g/mol. The figures for average molecular weight $M_w$ and for polydispersity PD in this specification relate to the determination by gel permeation chromatography. For this purpose it may be advantageous to carry out the polymerization in the presence of suitable chain transfer agents such as thiols, halogen compounds and/or alcohols, in order to set the desired average molecular weight.

The polyacrylates preferably have a K value of 30 to 90, more preferably of 40 to 70, measured in toluene (1% strength solution, 21° C.). The K value according to Fikentscher is a measure of the molecular weight and of the viscosity of the polymer.

Particularly suitable in accordance with the invention are polyacrylates which have a narrow molecular weight distribution range (polydispersity PD<4). These materials in spite of a relatively low molecular weight after crosslinking have a particularly good shear strength. The relatively low polydispersity also facilitates processing from the melt, since the flow viscosity is lower than for a broader-range polyacrylate while application properties are largely the same. Narrow-range poly(meth)acrylates can be prepared advantageously by anionic polymerization or by controlled radical polymerization methods, the latter being especially suitable. Via N-oxyls as well it is possible to prepare such polyacrylates. Furthermore, advantageously, Atom Transfer Radical Polymerization (ATRP) may be employed for the synthesis of narrow-range polyacrylates, the initiator used comprising preferably monofunctional or difunctional secondary or tertiary halides and the halide(s) being abstracted using complexes of Cu, Ni, Fe, Pd, Pt, Ru, Os, Rh, Co, Ir, Ag or Au.

The monomers for preparing the poly(meth)acrylates preferably include proportionally functional groups suitable for entering into linking reactions with epoxide groups. This advantageously permits thermal crosslinking of the polyacrylates by reaction with epoxides. Linking reactions are understood to be, in particular, addition reactions and substitution reactions. Preferably, therefore, there is a linking of the building blocks carrying the functional groups to building blocks carrying epoxide groups, more particularly in the sense of a crosslinking of the polymer building blocks carrying the functional groups via linking bridges comprising crosslinker molecules which carry epoxide groups. The substances containing epoxide groups are preferably polyfunctional epoxides, in other words those having at least two epoxide groups; accordingly, the overall result is preferably an indirect linking of the building blocks carrying the functional groups.

The poly(meth)acrylates of the PSA of the invention are crosslinked preferably by linking reactions—especially in the sense of addition reactions or substitution reactions—of functional groups they contain with thermal crosslinkers. All thermal crosslinkers may be used which not only ensure a sufficiently long processing life, meaning that there is no gelling during the processing operation, particularly the extrusion operation, but also lead to rapid postcrosslinking of the polymer to the desired degree of crosslinking at temperatures lower than the processing temperature, more particularly at room temperature. Possible for example is a combination of carboxyl-, amino- and/or hydroxyl-containing polymers and isocyanates, more particularly aliphatic or trimerized isocyanates deactivated with amines, as crosslinkers.

Suitable isocyanates are, more particularly, trimerized derivatives of MDI [4,4'-methylene-di(phenyl isocyanate)], HDI [hexamethylene diisocyanate, 1,6-hexylene diisocyanate] and/or IPDI [isophorone diisocyanate, 5-isocyanato-1-isocyanatomethyl-1,3,3-trimethylcyclohexane], examples being the types Desmodur® N3600 and XP2410 (each BAYER AG: aliphatic polyisocyanates, low-viscosity HDI trimers). Likewise suitable is the surface-deactivated dispersion of micronized trimerized IPDI BUEJ 339®, now HF9® (BAYER AG).

Also suitable in principle for the crosslinking, however, are other isocyanates such as Desmodur VL 50 (MDI-based polyisocyanates, Bayer AG), Basonat F200WD (aliphatic polyisocyanate, BASF AG), Basonat HW100 (water-emulsifiable polyfunctional, HDI-based isocyanate, BASF AG), Basonat HA 300 (allophanate-modified polyisocyanate based on HDI isocyanurate, BASF) or Bayhydur VPLS2150/1 (hydrophilically modified IPDI, Bayer AG).

Preference is given to using thermal crosslinkers at 0.1 to 5 wt %, more particularly at 0.2 to 1 wt %, based on the total amount of the polymer to be crosslinked.

The poly(meth)acrylates of the PSA of the invention are crosslinked preferably by means of one or more epoxides or one or more substances containing epoxide groups. The substances containing epoxide groups are more particularly polyfunctional epoxides, in other words those having at least two epoxide groups; accordingly, the overall result is an indirect linking of the building blocks of the poly(meth)acrylates that carry the functional groups. The substances containing epoxide groups may be aromatic compounds and may be aliphatic compounds.

Outstandingly suitable polyfunctional epoxides are oligomers of epichlorohydrin, epoxy ethers of polyhydric alcohols (more particularly ethylene, propylene and butylene glycols, polyglycols, thiodiglycols, glycerol, pentaerythritol, sorbitol, polyvinyl alcohol, polyallyl alcohol and the like), epoxy ethers of polyhydric phenols [more particularly resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also their hydroxyethyl ethers, phenol-formaldehyde condensation products, such as phenol alcohols, phenol aldehyde resins and the like, S- and N-containing epoxides (for example N,N-diglycidylaniline, N,N'-dimethyldiglycidyl-4,4-diaminodiphenylmethane) and also epoxides prepared by customary methods from polyunsaturated carboxylic acids or monounsaturated carboxylic esters of unsaturated alcohols, glycidyl esters, polyglycidyl esters, which may be obtained by polymerization or copolymerization of glycidyl esters of unsaturated acids or are obtainable from other acidic compounds (cyanuric acid, diglycidyl sulfide, cyclic trimethylene trisulfone and/or derivatives thereof, and others).

Very suitable ethers are, for example, 1,4-butanediol diglycidyl ether, polyglycerol-3 glycidyl ether, cyclohexanedimethanol diglycidyl ether, glycerol triglycidyl ether, neopentyl glycol diglycidyl ether, pentaerythritol tetraglycidyl ether, 1,6-hexanediol diglycidyl ether, polypropylene glycol diglycidyl ether, trimethylolpropane triglycidyl ether, bisphenol A diglycidyl ether and bisphenol F diglycidyl ether.

Particularly preferred for the poly(meth)acrylates as polymers to be crosslinked is the use of a crosslinker-accelerator system ("crosslinking system") described for example in EP 1 978 069 A1, in order to gain more effective control over not only the processing life and crosslinking kinetics but also the degree of crosslinking. The crosslinker-accelerator system comprises at least one substance containing epoxide groups, as crosslinker, and at least one substance which has an accelerating effect on crosslinking reactions by means of epoxide-functional compounds at a temperature below the melting temperature of the polymer to be crosslinked, as accelerator.

Accelerators used in accordance with the invention are more preferably amines (to be interpreted formally as substitution products of ammonia; in the formulae below, these substituents are represented by "R" and encompass in particular alkyl and/or aryl radicals and/or other organic radicals), more especially preferably those amines which enter into no reactions or only slight reactions with the building blocks of the polymers to be crosslinked.

Selectable in principle as accelerators are primary ($NRH_2$), secondary ($NR_2H$) and tertiary ($NR_3$) amines, and also of course those which have two or more primary and/or secondary and/or tertiary amine groups. Particularly preferred accelerators, however, are tertiary amines such as, for example, triethylamine, triethylenediamine, benzyldimethylamine, dimethylaminomethylphenol, 2,4,6-tris(N,N-dimethylaminomethyl)phenol and N,N'-bis(3-(dimethylamino)propyl)urea. As accelerators it is also possible with advantage to use polyfunctional amines such as diamines, triamines and/or tetramines. Outstandingly suitable are diethylenetriamine, triethylenetetramine and trimethylhexamethylenediamine, for example.

Used with preference as accelerators, furthermore, are amino alcohols. Particular preference is given to using secondary and/or tertiary amino alcohols, where in the case of two or more amine functionalities per molecule, preferably at least one, and preferably all, of the amine functionalities are secondary and/or tertiary. As preferred aminoalcohol accelerators it is possible to employ triethanolamine, N,N-bis(2-hydroxypropyl)ethanolamine, N-methyldiethanolamine, N-ethyldiethanolamine, 2-aminocyclohexanol, bis(2-hydroxycyclohexyl)methylamine, 2-(diisopropylamino)ethanol, 2-(dibutylamino)ethanol, N-butyldiethanolamine, N-butylethanolamine, 2-[bis(2-hydroxyethyl)

amino]-2-(hydroxymethyl)-1,3-propanediol, 1-[bis(2-hydroxyethyl)amino]-2-propanol, triisopropanolamine, 2-(dimethylamino)ethanol, 2-(diethylamino)ethanol, 2-(2-dimethylaminoethoxy)ethanol, N,N,N'-trimethyl-N'-hydroxyethyl bisaminoethyl ether, N,N,N'-trimethylaminoethylethanolamine and/or N,N,N'-trimethylaminopropylethanolamine.

Other suitable accelerators are pyridine, imidazoles (such as, for example, 2-methylimidazole) and 1,8-diazabicyclo[5.4.0]undec-7-ene. Cycloaliphatic polyamines as well may be used as accelerators. Suitable also are phosphate-based accelerators such as phosphines and/or phosphonium compounds, such as triphenylphosphine or tetraphenylphosphonium tetraphenylborate, for example.

Acrylate PSAs are typically radically polymerized copolymers of alkyl esters of acrylic acid or alkyl esters of methacrylic acid with C1 to C20 alcohols such as, for example, methyl acrylate, ethyl (meth)acrylate, n-butyl (meth)acrylate, tert-butyl (meth)acrylate, cyclohexyl (meth)acrylate, 2-ethylhexyl (meth)acrylate, n-octyl (meth)acrylate, isooctyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate, as well as other esters of (meth)acrylic acid such as isobornyl (meth)acrylate, benzyl (meth)acrylate, phenyl (meth)acrylate, and 2-bromoethyl (meth)acrylate, and alkoxyalkyl (meth)acrylates such as ethoxyethyl (meth)acrylate. Additionally included here are esters of ethylenically unsaturated dicarboxylic and tricarboxylic acids and anhydrides such as ethyl maleate, dimethyl fumarate, and ethyl methyl itaconate. Likewise included are vinylaromatic monomers such as, for example, styrene, vinyltoluene, methylstyrene, n-butylstyrene, and decylstyrene.

Further possible monomers are vinyl esters of carboxylic acids comprising up to 20 carbon atoms, such as vinyl acetate or vinyl laurate, vinyl ethers of alcohols comprising up to 10 carbon atoms, such as vinyl methyl ether or vinyl isobutyl ether, vinyl halides such as vinyl chloride or vinylidene dichloride, nitriles such as acrylonitrile or methacrylonitrile, acid amides such as acrylamide or methacrylamide, and unsaturated hydrocarbons having 2 to 8 carbon atoms such as ethylene, propene, butadiene, isoprene, 1-hexene, or 1-octene. Contemplated for the purpose of influencing the physical and optical properties of the PSA are polyfunctional, ethylenically unsaturated monomers as crosslinker monomers. Examples in this regard are divinylbenzene, alkyl diacrylates such as 1,2-ethylene glycol diacrylate, 1,4-butanediol diacrylate, 1,6-hexanediol diacrylate, 1,8-octanediol diacrylate or 1,12-dodecanediol diacrylate, triacrylates such as trimethylolpropane triacrylate, and tetraacrylates such as pentaerythritol tetraacrylate. Also included among the group of the polyfunctional monomers are UV-crosslinkable monomers, such as, for example, (meth)acrylate-functionalized derivatives of benzophenone or of benzoin.

Another group of monomers are those which generate a potential for latent crosslinking within the polymer and which, after the adhesive has dried, lead spontaneously (frequently with catalysis) to the construction of a network. An example of such a monomer is glycidyl methacrylate, whose oxirane ring leads to ring opening with hydroxyl functions or, in particular, with carboxylate functions and so to a covalent bond. This reaction takes place in accelerated form in the presence of zinc ions or—especially when carboxyl functions are present—of amines.

In order for pressure-sensitive adhesive properties to be obtained, the processing temperature of the adhesive must be above its glass transition temperature, in order to have viscoelastic properties.

Furthermore, acrylate-based activatable adhesives of the invention can be used. In that case, in one particularly preferred version, the activatable adhesives are constituted by a base polymer a) consisting of a1) 40 to 95 wt % of acrylic esters and/or methacrylic esters with the following formula $CH_2=C(R_1)(COOR_2)$
where $R_1$ is H or $CH_3$ and $R_2$ is H and/or alkyl chains having 1 to 30 C atoms a2) 5 to 30 wt % of a copolymerizable vinyl monomer having at least one carboxylic acid and/or sulfonic acid and/or phosphonic acid group a3) 1 to 10 wt % of a copolymerizable vinyl monomer having at least one epoxy group or one acid anhydride function a4) 0 to 20 wt % of a copolymerizable vinyl monomer which with the functional group is able to contribute to boosted cohesion, to an increase in the reactivity of the crosslinking, or to the direct crosslinking, and b) 5 to 50 wt % of an epoxy resin or of a mixture of two or more epoxy resins The polymer a) may comprise an activatable PSA which becomes pressure-sensitively adhesive on exposure to temperature and, optionally, pressure, and which after bonding and cooling develops a high bond strength through solidification. Depending on application temperature, these activatable PSAs have different static glass transition temperatures $T_{g,A}$ or melting points $T_{m,A}$.

In one very preferred version, monomers used for the monomers a1) are acrylic monomers which comprise acrylic and methacrylic esters with alkyl groups consisting of 4 to 14 C atoms, preferably 4 to 9 C atoms. Specific examples, without wishing this enumeration to impose any restriction, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof such as, for example, 2-ethylhexyl acrylate. Other classes of compound for use, which may likewise be added in minor amounts under a1), are methyl methacrylates, cyclohexyl methacrylates, isobornyl acrylate, and isobornyl methacrylates.

Used with preference as monomers a2) are itaconic acid, acrylic acid, methacrylic acid, vinylacetic acid, fumaric acid, crotonic acid, aconitic acid, dimethylacrylic acid, β-acryloyloxypropionic acid, trichloroacrylic acid, vinylphosphonic acid, and vinylsulfonic acid.

Used with preference as monomers a3) are glycidyl methacrylate, maleic anhydride, and itaconic anhydride.

One very preferred version uses, for the monomers a4), vinyl esters, vinyl ethers, vinyl halides, vinylidene halides, vinyl compounds with aromatic cycles and heterocycles in α-position. Here again, without exclusivity, a number of examples may be given: vinyl acetate, vinylformamide, vinylpyridine, ethyl vinyl ether, vinyl chloride, vinylidene chloride, and acrylonitrile.

One further very preferred version uses, for the monomers a4), monomers having the following functional groups: hydroxy, acid amide, isocyanato or amino groups.

Further particularly preferred examples for component a4) are hydroxyethyl acrylate, hydroxypropyl acrylate, hydroxyethyl methacrylate, hydroxypropyl methacrylate, allyl alcohol, acrylamide, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, tetrahydrofurfuryl acrylate, this enumeration not being conclusive. In a further preferred version, use is made, for component a4), of aromatic vinyl compounds, in which case preferably the aromatic rings consist of $C_4$ to $C_{18}$ and may also include heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

For the polymerization the monomers are selected in turn such that the resulting polymers can be used as industrially useful adhesives or PSAs, more particularly such that the resulting polymers have adhesive or pressure-sensitive adhesive properties in the sense of the "Handbook of Pressure Sensitive Adhesive Technology" by Donatas Satas (van Nostrand, New York 1989). Here as well the desired glass transition temperature can be controlled through the application of the Fox equation (E1) for the compilation of the monomer mixture on which the polymerization is based. For PSAs the static glass transition temperature of the resulting polymer is advantageously below 15° C.

In order to obtain a polymer glass transition temperature $T_{g,A}$ of ≥30° C. for heat-activatable adhesive, the monomers are very preferably selected, and the quantitative composition of the monomer mixture advantageously chosen, in accordance with the remarks above, in such a way as to give the desired $T_{g,A}$ value for the polymer in accordance with the Fox equation (E1) (cf. T. G. Fox, Bull. Am. Phys. Soc. 1 (1956) 123).

$$\frac{1}{T_g} = \sum_n \frac{w_n}{T_{g,n}} \qquad (E1)$$

In this equation n represents the serial number of the monomers used, $w_n$ the mass fraction of the respective monomer n (wt %), and $T_{g,n}$ the respective glass transition temperature of the homopolymer of the respective monomers n in K.

For the preparation of the adhesives, advantageously, conventional radical polymerizations or controlled radical polymerizations are carried out. For the polymerizations proceeding by a radical route, preference is given to using initiator systems which further comprise other radical initiators for the polymerization, especially thermally decomposing radical-forming azo or peroxo initiators. Suitable in principle, however, are all of the initiators that are typical for acrylates and familiar to the skilled person. The production of C-centred radicals is described in Houben Weyl, Methoden der Organischen Chemie, Vol. E 19a, pages 60 to 147. These methods are preferentially employed analogously.

Examples of radical sources are peroxides, hydroperoxides, and azo compounds; certain nonexclusive examples of typical radical initiators may be given here as potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate, and benzopinacol. One very preferred version uses 1,1'-azobis(cyclohexanecarbonitrile) (Vazo 88™ from DuPont) as radical initiator.

The average molecular weights $M_n$ of the PSAs resulting from the radical polymerization are very preferably selected such that they are in a range from 20 000 to 2 000 000 g/mol; specifically for further use as pressure-sensitive hotmelt adhesives, PSAs are prepared that have average molecular weights $M_n$ of 100 000 to 500 000 g/mol.

The polymerization can be conducted in bulk, in the presence of one or more organic solvents, in the presence of water, or in mixtures of organic solvents and water. The aim here is to minimize the amount of solvent used.

Depending on conversion and temperature, the polymerization time is between 4 and 72 hours. The higher the level at which it is possible to select the reaction temperature, in other words the higher the thermal stability of the reaction mixture, the lower the reaction time can be.

In order to increase the cohesion between the adhesive and the film, the film may be subjected to a corona treatment.

Also advantageous is the etching of the film, in order to be able to anchor the adhesive. In one variant of the invention, there is a primer present between lower film and adhesive in order to improve the adhesion of the adhesive on the film.

Descriptions of the primers customarily used are found for example in "Handbook of Pressure Sensitive Adhesive Technology" by Donatas Satas (van Nostrand, 1989).

The upper and lower films in the diecut preferably have the same shape and size and are disposed congruently.

With further preference, these conditions also apply to any other films present.

A typical size of the diecut, allowing many of the smaller holes to be closed, is represented by a (circular) disk having a diameter of 10 to 60 mm, more particularly 30 to 40 mm.

The lower film is preferably coated over its full area with the adhesive.

The method of the invention for closing a hole especially in a vehicle body with a diecut of the invention simply involves the application of the diecut to the hole to be closed, in such a way that the hole is completely covered by the diecut.

It is preferred for the diecut to be applied concentrically over the hole to be closed. The contours of the diecut preferably correspond to the contour of the hole to be closed. In this way the overlap of the individual layers of the diecut is symmetrical. The margin of overlap is preferably between 1 and 20 mm, more preferably between 5 and 10 mm.

The diecut of the invention is superior to the solutions known from the prior art, particularly under heightened mechanical stress. The introduction of the functional layer, acting as a barrier layer or additionally as a primer layer, improves not only the anchoring of the PSA on the heavy-duty film, but also the mechanical strength. Additionally, the PSA is shielded from external influences (such as, for example, migration of lubricants through the heavy-duty film) and so affords increased reliability of bonding over the life cycle of the vehicle. Despite the greater bonding reliability, the diecut can be removed relatively simply in a repair scenario. This effect derives from the overall improvement in the adhesion of the assembly, and from the much better tensile strength. Furthermore, a single embodiment of the diecut is able to cover a multiplicity of holes of different sizes.

The diecut is distinguished by:
very high load-bearing capacity/tear resistance/puncture resistance very good sealing with respect to moisture/moisture barrier
effective sealing with respect to noises/sound damping
very good sealing with respect to oils
high tear strength According to one advantageous embodiment of the invention, the diecut has puncture resistances of 200 to 2000 N.

The surface of the diecut part offers an appealing and smooth surface in respect of optical qualities and tactile qualities.

Test Methods

The measurements are conducted (unless otherwise indicated) under testing conditions of 23±1° C. and 50±5% relative humidity.

Molar Mass Mn and the Weight-Average Molar Mass Mw

The figures for the number-average molar mass Mn and the weight-average molar mass Mw in this specification relate to the determination by gel permeation chromatography (GPC). The determination is made on 100 μl of sample subjected to clarifying filtration (sample concentration 4 g/l). The eluent used is tetrahydrofuran with 0.1 vol % of trifluoroacetic acid. The measurement is made at 25° C.

The precolumn used is a PSS-SDV-type column, 5 μm, $10^3$ Å, 8.0 mm*50 mm (statements here and below in the following order: type, particle size, porosity, internal diameter*length; 1 Å=$10^{-10}$ m). Separation takes place using a combination of the columns of type PSS-SDV, 5 μm, $10^3$ Å and also $10^5$ Å and $10^6$ Å each of 8.0 mm×300 mm (columns from Polymer Standards Service; detection by means of Shodex R171 differential refractometer). The flow rate is 1.0 ml per minute. Calibration takes place against PMMA standards (polymethyl methacrylate calibration) in the case of polyacrylates and against PS standards (polystyrene calibration) otherwise (resins, elastomers).

The polyacrylates preferably have a K value of 30 to 90, more preferably of 40 to 70, as measured in toluene (1% strength solution, 21° C.). The K value according to Fikentscher is a measure of the molecular weight and the viscosity of the polymer.

K Value

The principle of the method is based on capillary-viscosimetric determination of the relative solution viscosity. For this purpose the test substance is dissolved by shaking for thirty minutes in toluene, to give a 1% strength solution. In a Vogel-Ossag viscometer at 25° C. the flow time is measured and from this, in relation to the viscosity of the pure solvent, the relative viscosity of the sample solution is ascertained. The K value can be read off from tables by the method of Fikentscher [P. E. Hinkamp, Polymer, 1967, 8, 381] (K=1000 k).

Glass Transition Temperature

The glass transition temperature is determined by means of dynamic scanning calorimetry (DSC). This is done by weighing out 5 mg of an untreated polymer sample into an aluminium crucible (volume 25 μL) and closing the crucible with a perforated lid. Measurement takes place using a DSC 204 F1 from Netzsch. For inertization, operation takes place under nitrogen. The sample is first cooled to −150° C., then heated to +150° C. at a heating rate of 10 K/min, and again cooled to −150° C. The subsequent, second heating curve is run again at 10 K/min, and the change in the heat capacity is recorded. Glass transitions are recognized as steps in the thermogram.

The glass transition temperature is evaluated as follows (see FIG. 2):

A tangent is applied in each case to the baseline of the thermogram before ① and after ② the step. In the region of the step, a balancing line ⑤ is placed parallel to the ordinate in such a way that it intersects the two tangents, specifically so as to form two areas ③ and ④ of equal content (between in each case the tangent, the balancing line, and the measuring plot). The point of intersection of the balancing lines thus positioned with the measuring plot gives the glass transition temperature.

Peel Adhesion

The peel adhesion (in accordance with AFERA 5001) is determined as follows: the defined substrate used is galvanized steel sheet with a thickness of 2 mm (obtained from Rocholl GmbH). The bondable sheetlike element under investigation is cut to a width of 20 mm and a length of about 25 cm, is provided with a handling section, and immediately thereafter is pressed onto the selected substrate five times using a 4 kg steel roller, with a rate of advance of 10 m/min. Immediately after that, the bondable sheetlike element is peeled from the substrate at an angle of 180° using a tensile testing instrument (from Zwick) with a velocity v=300 mm/min, and the force needed to achieve this at room temperature is recorded. The recorded value (in N/cm) is obtained as the average from three individual measurements.

Puncture Resistance

The puncture resistance is determined by closing a hole with a diecut and subjecting it to targeted puncture. In this case, in a tensile testing machine, a spike is clamped in, this spike approaching the horizontally positioned, closed hole at constant velocity and puncturing the hole by 30 mm. During the procedure, the force that has to be employed is recorded.

Below, on the basis of a figure, the diecut for the permanent closing of holes especially in metal sheets or in plastics parts of automobile bodies is to be elucidated in more detail, without any intention of a restrictive effect in any form.

Figure 1:
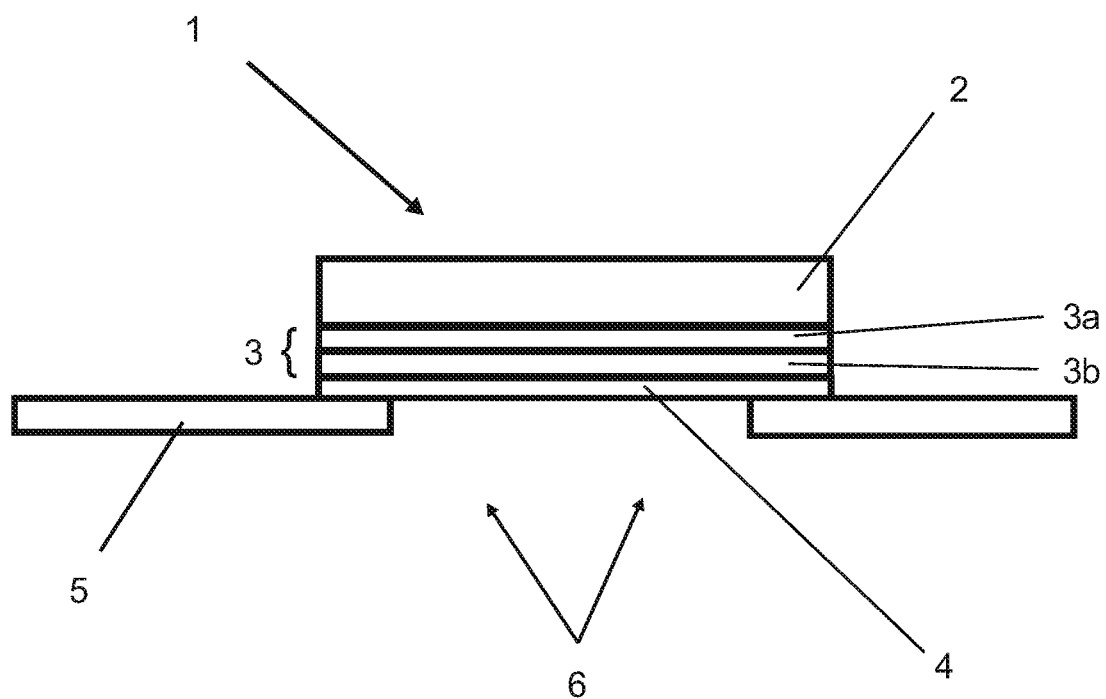
FIG. 1 shows a hole in a body that is to be closed, and also the state after closure of the hole that was to be closed.
Figure 2:
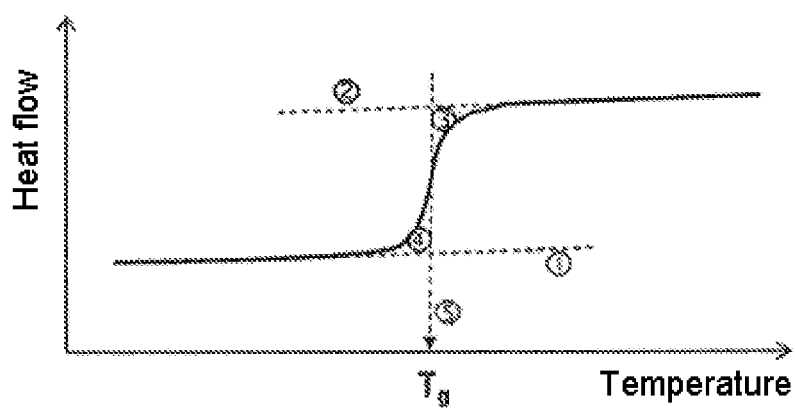
FIG. 2 is a graph showing the relation between heat flow along the y-axis and temperature along the x-axis for evaluating glass transition temperature.

The body 5 contains, as a result of its construction, a hole 6, which is to be closed.

For this purpose, a diecut 1 with a carrier composed of a laminate of at least two polymeric films, namely an upper film 2 and a lower film 3, the upper film 2 having a basis weight of at least 1.0 kg/m², and a pressure-sensitive adhesive 4 is fixed on the hole 6 in such a way that the hole 6 is covered fully by the diecut.

The lower film 3 consists of two layers, a polymeric film 3a and a functional layer 3b, which has barrier properties.

The area of the diecut 1 is greater than the area of the hole 6 to be closed, and so the hole 6 is closed over its full area.

In the text below, the invention is elucidated in more detail by a number of examples, without wishing thereby to restrict the invention.

INVENTIVE EXAMPLE

The carrier of the diecut of the invention consists of an assembly of two polymeric films.

The composition of the upper film is as follows:

| | |
|---|---|
| 40 wt % | CaCO$_3$ as filler |
| 30 wt % | Polyethylene |
| 10 wt % | EVA |
| 20 wt % | Oil |

The thickness of the film is 2000 μm, and the basis weight is 2.5 kg/m$^2$.

The lower film of the two polymeric films consists of at least two layers, a first layer in the form of a polyethylene film, which faces the heavy-duty film, and a second layer in the form of a functional layer of polyamide.

The thickness of the polymeric film is 70 μm, and the thickness of the functional layer is 20 μm.

As adhesive, a customary acrylate-based pressure-sensitive adhesive is coated at 80 μm onto the carrier.

Test results:

| | |
|---|---|
| Peel adhesion, steel, fresh | 13 N/cm |
| Peel adhesion, steel, after one month 40° C. | 12 N/cm |

COMPARATIVE EXAMPLE

The composition of the film is the same as that of the heavy-duty film:

| | |
|---|---|
| 40 wt % | CaCO$_3$ as filler |
| 30 wt % | Polyethylene |
| 10 wt % | EVA |
| 20 wt % | Oil |

In this case there is no lower film with barrier layer effect between the heavy-duty film and the adhesive.

The adhesive and also the applied weight are the same as those used in the inventive example.

| | |
|---|---|
| Peel adhesion, steel, fresh | 10 N/cm |
| Peel adhesion, steel, after one month 40° C. | 2 to 4 N/cm |

The peel adhesions measured in the inventive and comparative examples immediately after bonding are virtually the same.

Conversely, after storage of one month at 40° C., the peel adhesion of the comparative example is much lower than the peel adhesion of the inventive example.

The reason for this is that in the comparative example, oil has migrated from the heavy-duty film into the adhesive and/or, in the opposite direction, tackifier resin has migrated from the adhesive into the heavy-duty film. Both effects lead to a reduction in the bond strength.

In the inventive example, in contrast, these migrations are prevented by the lower film, which comprises a first layer in the form of a polyethylene film and a second layer in the form of a functional layer of polyamide.

We claim:

1. A diecut configured for permanent closing of at least one hole, the diecut comprising:
   a carrier comprising an assembly of at least two polymeric films,
   wherein
   the at least two polymeric films comprise an upper film and a lower film, the upper film having a basis weight of at least 1.0 kg/m$^2$ and the lower film consisting of at least two layers,
   the at least two layers of the lower film have a first layer in the form of a polymeric film facing the upper film and a second layer in the form of a functional layer,
   a side of the lower film facing away from the upper film has an applied adhesive composition
   the functional layer has a first barrier effect with respect to first migratable substances that are diffusible into the applied adhesive composition and a second barrier effect with respect to second migratable substances that are diffusible into the upper film,
   the first migratable substances comprise one or more oils, one or more lubricants, and one or more plasticizers,
   the second migratable substances comprise one or more tackifier resins, and
   a melting point of a polymer of the functional layer is above a melting point of a polymer of the upper film by 20° C.

2. The diecut according to claim 1, wherein the upper film of the at least two polymeric films and the polymeric film and the functional layer of the lower film are each implemented over the full area and are free from holes or vacancies.

3. The diecut according to claim 1, wherein the upper film has a basis weight of between 1.0 and 6 kg/m$^2$.

4. The diecut according to claim 3, wherein the upper film has a basis weight of between 1.5 and 3.9 kg/m$^2$.

5. The diecut according to claim 4, wherein the upper film has a basis weight of between 1.5 and 2.5 kg/m$^2$.

6. The diecut according to claim 1, wherein the upper film is an elastomer-modified bitumen film.

7. The diecut according to claim 1, wherein the upper film is a polyolefin film.

8. The diecut according to claim 7, wherein the upper film is a polyethylene and ethylene-vinyl acetate film.

9. The diecut according to claim 8, wherein the polyethylene and ethylene-vinyl acetate film is mineral-filled.

10. The diecut according to claim 1, wherein the polymeric film of the lower film consists of a type of polymer used in the upper film.

11. The diecut according to claim 1, wherein the polymeric film of the lower film consists of polyolefin.

12. The diecut according to claim 11, wherein the polymeric film of the lower film consists of polyethylene.

13. The diecut according to claim 1, wherein the melting point of the polymer of functional layer is above the melting point of the polymer of the upper film by 50° C.

14. The diecut according to claim 1, wherein the polymer of the functional layer comprises one or more selected from the group consisting of polyethylene terephthalate, polyamide, polyurethane, polyoxymethylene, polyvinyl chloride, polyethylene napthalate, ethylene-vinyl alcohol, polyvinylidene chloride, polyvinylidene fluoride, polyacrylonitrile, polycarbonate, polyethersulfone, polyimide, polyarylene sulfide, polyarylene oxide, and mixtures thereof.

15. The diecut according to claim 14, wherein the polymeric film of the lower film consists of polyethylene and polymer of the functional layer consists of polyamide.

16. The diecut according to claim 1, wherein the thickness of the upper film is between 400 and 3500 μm and the thickness of the lower film is between 25 and 200 μm.

17. The diecut according to claim 1, wherein the applied adhesive composition is an acrylate-based self-adhesive composition.

18. A vehicle body comprising:
   at least one hole to be closed; and
   the diecut according to claim 1 applied over and closing the at least one hole.

19. The diecut according to claim 18, wherein the diecut is applied concentrically over the at least one hole.

20. The diecut according to claim 19, wherein contours of the diecut correspond to the contour of the at least one hole such that a margin of overlap is between 1 and 20 mm.

* * * * *